(12) United States Patent
Niederholz et al.

(10) Patent No.: US 7,940,853 B2
(45) Date of Patent: *May 10, 2011

(54) METHOD AND DEVICE FOR CALCULATING ZERO-CROCCING REFERENCE SEQUENCES FOR SIGNAL DETECTION OF ANGLE-MODULATED SIGNALS BASED ON ZERO CROSSINGS OF THE RECEIVED SIGNAL

(75) Inventors: Juergen Niederholz, Geldern (DE); Andre Neubauer, Krefeld (DE)

(73) Assignee: Intel Mobile Communications GmbH, Neubiberg (DE)

( * ) Notice: Subject to any disclaimer, the term of this patent is extended or adjusted under 35 U.S.C. 154(b) by 52 days.

This patent is subject to a terminal disclaimer.

(21) Appl. No.: 12/358,255

(22) Filed: Jan. 23, 2009

(65) Prior Publication Data

US 2010/0027705 A1    Feb. 4, 2010

Related U.S. Application Data

(63) Continuation of application No. 11/373,463, filed on Mar. 10, 2006, now Pat. No. 7,564,926.

(30) Foreign Application Priority Data

Sep. 12, 2003   (DE) .................................. 103 42 192

(51) Int. Cl.
  *H04L 27/10* (2006.01)
(52) U.S. Cl. ...................................................... 375/278
(58) Field of Classification Search .................. 332/101, 332/104; 370/293; 375/278, 303, 322, 324; 455/137

See application file for complete search history.

(56) References Cited

U.S. PATENT DOCUMENTS

| 4,672,634 | A | * | 6/1987 | Chung et al. ................... 375/303 |
| 4,715,048 | A | * | 12/1987 | Masamura ..................... 375/347 |
| 5,103,463 | A | * | 4/1992 | Schoeneberg ................. 375/278 |
| 5,303,262 | A | | 4/1994 | Johnson |
| 5,463,211 | A | * | 10/1995 | Arends et al. ............. 235/462.27 |
| 5,784,416 | A | | 7/1998 | Yang |
| 6,617,917 | B2 | | 9/2003 | Yang et al. |
| 2004/0029599 | A1 | | 2/2004 | Mehrgardt et al. |

FOREIGN PATENT DOCUMENTS

DE      101 03 479 A1    8/2002

OTHER PUBLICATIONS

Asano et al ("Optimization of coded GMSK systems", IEEE Transactions on Information Theory Publication Date: Oct. 2002, vol. 48, Issue: 10, pp. 2768-2773).*

(Continued)

*Primary Examiner* — David C. Payne
*Assistant Examiner* — Leon-Viet Q Nguyen
(74) *Attorney, Agent, or Firm* — SpryIP, LLC

(57) ABSTRACT

A method for calculating zero-crossing reference sequences ($\{t_i\}$) for the data detection of a sequence of zero crossings ($\{\hat{t}_i\}$) of a received signal is disclosed. The data detection is determined in a receiver, wherein the received signal is based on a data symbol sequence ($\{d_k\}$) angle-modulated at a transmitter and transmitted to the receiver. The zero-crossing reference sequences ($\{t_i\}$) are calculated in accordance with an equation specifying an output of a finite state machine that describes, at least approximately, the signal generation in the transmitter.

11 Claims, 4 Drawing Sheets

OTHER PUBLICATIONS

Xia et al ("A GFSK demodulator for low-IF Bluetooth receiver", IEEE Journal of Solid-State Circuits, Publication Date: Aug. 2003, vol. 38 Issue: 8, pp. 1397-1400).*

David K: Asano, Subbarayan Pasupathy; Optimization of Coded GMSK Systems; IEEE Transactions on Information Theory; Oct. 10, 2002; pp. 2768-2773; vol. 48, No. 10.

Bo Xia, Chunyu Xin, Wenjun Sheng, Ari Yakov Valero-Lopez, Edgar Sanchez-Sinencio, A GFSK Demodulator For Low-IF Bluetooth Receiver, IEEE Journal of Solid-State Circuits; Aug. 2003; pp. 1397-1400; vol. 38, No. 8.

Yasunori Iwanami; Performance of Sequence Estimation Scheme of Narrowband Digital FM Signals with Limiter-Discriminator Detection; IEEE Journal on Selected Areas in Communications; Feb. 1995; pp. 310-315; vol. 13, No. 2.

File History, U.S. Appl. No. 11/373,463, filed Mar. 10, 2006, Patent No. 7,564,926.

* cited by examiner

METHOD AND DEVICE FOR CALCULATING ZERO-CROCCING REFERENCE SEQUENCES FOR SIGNAL DETECTION OF ANGLE-MODULATED SIGNALS BASED ON ZERO CROSSINGS OF THE RECEIVED SIGNAL

FIELD OF THE INVENTION

The present invention relates to a method and to a device for calculating zero-crossing reference sequences for the data detection of a sequence of zero crossings, determined in a receiver, of a received signal which is based on a data symbol sequence which is angled-modulated.

BACKGROUND OF THE INVENTION

In cordless digital communication systems which are based on the Bluetooth, DECT, WDCT standard or a similar standard, traditional signal processing methods are used for demodulating the received signal and for the signal detection at the receiver end. Receiver designs are known in which the intermediate-frequency signal is converted into the digital domain with the aid of an analog/digital converter and the signal detection is implemented with the aid of methods of digital signal processing. Using such methods, a high-quality signal detection can be achieved but it is disadvantageous that an elaborate analog/digital converter is needed. Such a method, which is frequently used, is based on the so-called limiter-discriminator demodulator in which, after hard limiting of the band-pass signal which, as a rule, is complex, the received angle-modulated signal is demodulated, e.g. by means of an analog coincidence demodulator.

In the printed document DE 102 14 581.4, an intermediate-frequency receiver is described which uses a zero-crossing detector for the signal detection. The zero-crossing detector measures the time intervals between the zero crossings of a received intermediate-frequency signal and determines the transmitted data symbols from the zero-crossing information. For this purpose, the sequence of zero-crossing intervals output by the zero-crossing detector is stored in digital form in a shift register chain and compared with previously stored zero-crossing reference sequences in a classification unit. A city block metric is proposed for measuring the distance between the sequences measured and the sequences stored. The previously stored zero-crossing reference sequence which has the smallest distance from the measured zero-crossing sequence is selected. The symbol corresponding to this selected zero-crossing reference sequence (or the symbol sequence associated with this zero-crossing reference sequence, respectively) represents the detected symbol (the detected symbol sequence) and thus the solution of the detection problem.

From the points of view of expenditure and costs, using a zero-crossing detector is a very interesting receiver concept since it enables an (expensive) analog/digital converter to be dispensed with. The problem with this receiver concept is that the number of zero crossings in a symbol interval fluctuates in dependence on the data and other influencing variables (known system parameters, unknown interfering influences). For this reason, it is difficult to allocate successive zero crossings of the zero-crossing sequence measured directly to the equidistant symbol intervals. The advantage of conventional digital receiver concepts which have a fixed, or at least known, number of samples per symbol interval is thus not present in the receiver concept with a zero-crossing detector.

Apart from the problem of allocating zero crossings measured in the receiver to symbol intervals, a further problem is the use of zero-crossing detectors in the determination of zero-crossing reference sequences, by means of which a symbol-interval-related comparison with the measured sequence of zero crossings can be managed. An inexpensive implementation of this receiver design based on a detection of zero crossings of the received signal or of an intermediate-frequency signal is only made possible by as efficient as possible a form of calculating such zero-crossing reference sequences.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a method and a device for the inexpensive calculation of zero-crossing reference sequences for a data detection which is based on the evaluation of a sequence of zero crossings, determined in the receiver, of a received signal.

Accordingly, the zero-crossing reference sequences are calculated in accordance with an equation specifying the output of a finite state machine (FSM), the finite state machine describing at least approximately the signal generation in the transmitter.

According to the definition of the term by the NIST (National Institute of Standards and Technology, http://www.nist.gov/dads/HTML/finiteStateMachine.html), a state machine with output is a calculation model consisting of a set of states, a starting state, an input symbol alphabet, a transfer function which maps (at least) one symbol input and (at least) one current state onto a next state, and (at least) one output which provides output values which are combined via an equation with state transitions and/or states of the state machine. It is thus of significance for the invention that (1) the zero-crossing reference sequences can be described as output values of an FSM and that (2) the equation which describes the relationship between the state variables describing one state of the FSM and the output values of the FSM (i.e. the zero crossings) is linear. Combining these two measures provides for a simple calculation of the zero-crossing reference sequences which, in particular, can also be performed efficiently in real time in the receiver.

It is pointed out that information contained in zero crossings can be represented in various ways, e.g. as a sequence of the times of the zero crossings or as a sequence of the time intervals between successive zero crossings, etc. The terms zero-crossing reference sequences and sequences of zero crossings are generally meant as sequences of corresponding zero-crossing information, i.e. are intended to comprise the forms of representation mentioned, and others, of information obtained by measuring zero crossings.

If in the case of a modulation at the transmitter, a modulation memory of length L, with $L \geq 2$, is used (this is also called a so-called partial response modulation method in which the spectral impulse function g(t) extends over a number of symbol intervals), the memory of the modulation is taken into consideration in linear form by the mathematical model defined by the FSM. The type of modulation, particularly the selected spectral impulse function g(t) influences the linear equation which specifies the relationship between the state variables and the output values of the FSM.

The signal, angle-modulated at the transmitter, is preferably generated in accordance with a CPFSK (continuous phase frequency shift keying) method with continuous phase. One representative of CPFSK modulation methods is GFSK (Gaussian frequency shift keying) which is used in, among others, Bluetooth or DECT systems. In GFSK, the relationship between state variables and zero crossings is not linear so that, according to the invention, this relationship is initially linearized in order to obtain a linear equation according to one embodiment of the invention.

The signal angle-modulated at the transmitter can also be modulated in accordance with a binary FSK or MSK modulation method. These two modulation methods are also CPFSK modulation methods and thus have memory (it is known that the memory of an FSK signal is a consequence of the requirement for a continuous phase). However, the modulation forms of binary FSK and MSK differ from GFSK in that in these, an inherently linear relation exists between the state variables and the zero crossings of the zero-crossing sequences. When the finite state machine according to the invention is used, no approximation error will thus occur in this case.

The zero-crossing reference sequences calculated in the manner according to the invention can be used for a demodulation method for determining the transmitted data symbol sequence. For this purpose, the zero-crossing reference sequences calculated according to the invention are compared with the detected sequence of zero crossings and the transmitted data symbol sequence is determined by means of the results of the comparison.

A first advantageous embodiment of a demodulation method comprises comparing a part-sequence of finite length of the detected sequence of zero crossings with the zero-crossing reference sequences for each time increment. The method further comprises determining a data symbol transmitted in the time increment considered or a transmitted data symbol sequence of predetermined length by means of the results of the comparison. In this non-trellis-based procedure, in which detection takes place data symbol by data symbol independently of one another (i.e. without taking into consideration earlier data symbol decisions in the current data symbol decision), the city block comparison metric described in the document DE 101 03 479.3 or other analogous comparison procedure can be used.

A second advantageous embodiment of a demodulation method is characterized in that a determination of the transmitted symbol sequences is performed in accordance with the Viterbi algorithm by processing a trellis diagram which represents a state diagram of the finite state machine, for each time increment, the transition metric values between a precursor state and a target state in the trellis diagram being calculated by comparing the state-dependent zero-crossing reference sequences with the sequence of zero crossings detected for the time increment considered. The advantage of efficiency of this embodiment results from the progressive calculation of the path metric by adding the transition metric values newly calculated in each time increment to the path metrics of the preceding states in the known performance of the ACS (add compare select) operations of the Viterbi algorithm.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the text which follows, the invention will be explained in greater detail with reference to an exemplary embodiment, referring to the drawings, in which.

DETAILED DESCRIPTION OF THE INVENTION

Figure 1:
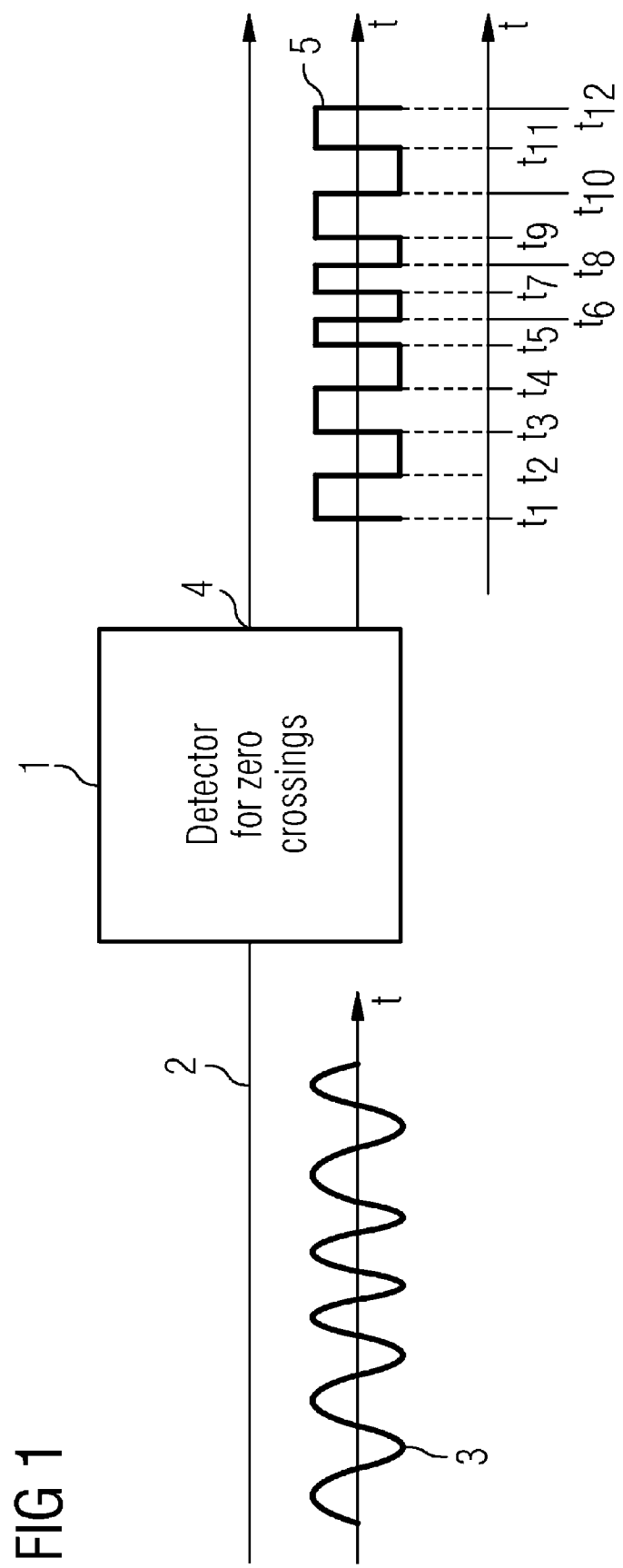
FIG. 1 is a block diagram illustrating a detector for zero crossings.

FIG. 1 shows a detector 1 for zero crossings that is supplied with an analog angle-modulated signal 3, represented over time t, at an input 2. The analog angle-modulated signal 3 can be located, for example, in an intermediate-frequency range. The intermediate frequency should be higher than the symbol frequency so that a number of zero crossings of the intermediate frequency occur in each symbol period.

The detector 1 for zero crossings is a limiter-discriminator which outputs at its output 4 a two-valued signal 5, the zero crossings of which indicate the times $t_1, t_2, \ldots, t_{12}, \ldots$ of the analog input signal 3. Demodulation occurs on the basis of these zero crossing times $t_1, t_2, \ldots$.

Figure 2:
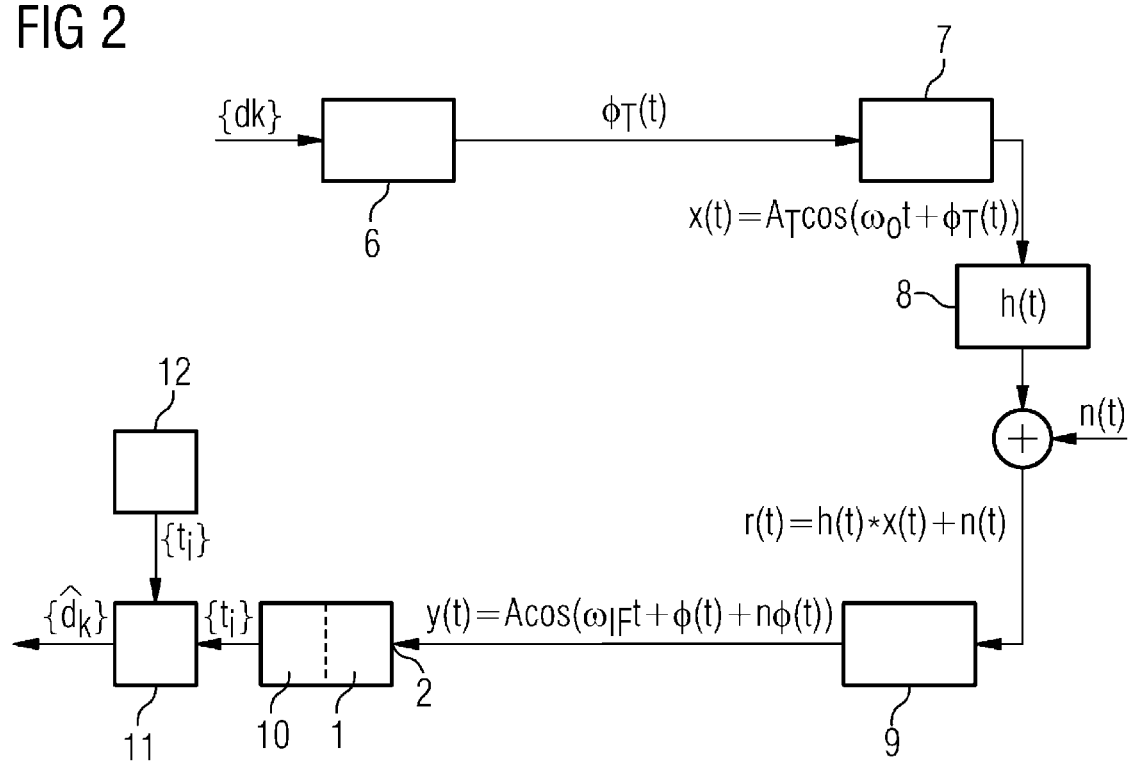
FIG. 2 is a block diagram illustrating a model of a transmission system comprising a transmitter, channel and receiver with a zero crossing reference sequence generator according to one embodiment of the present invention.

FIG. 2 shows a model of an angle-modulating transmission system. The data symbol sequence $\{d_k\}$ to be transmitted is supplied to a modulator 6 at the transmitter. In the modulator 6, a suitable modulation, for example CPFSK modulation, is performed. The phase function $\phi_T(t)$ provided by the modulator 6 is supplied to a radio-frequency section 7 of the transmitter. The radio-frequency section 7 radiates a real-value radio-frequency signal x(t) via an antenna (not shown), the signal amplitude being designated by $A_T$ and the carrier frequency being designated by $\omega_o$ in FIG. 2.

The radio-frequency signal x(t) is transmitted via a multi-path channel 8 which is assumed to be free of dispersion spectrally and temporally. In particular, it is assumed that no intersymbol interference (ISI) occurs. The transmission characteristic of the multi-path channel 8 is specified by the impulse response h(t). In addition, additive channel noise represented by the function n(t) is superimposed on the transmitted radio-frequency signal.

The received signal r(t) received by a radio-frequency section 9 at the receiver via an antenna (not shown) is obtained by a convolution of the impulse response h(t) with the radiated signal x(t) with the addition of the noise contribution n(t). This signal is down converted into an intermediate-frequency signal y(t) in the radio-frequency section 9 of the receiver. In FIG. 2, A designates the amplitude of the intermediate frequency signal, $\omega_{IF}$ designates the angular frequency of the intermediate-frequency signal, $\phi(t)$ designates the phase function and $n_\phi(t)$ designates a phase noise contribution of this signal. y(t) is the reconstruction of the angle-modulated signal 3 for the detector 1 for zero crossings at the receiving end.

The detector 1 for zero crossings is followed by a counter 10 which evaluates the zero crossings of the limiter signal 5 and outputs a sequence of zero-crossing times in the form of a sequence of counts $\{\hat{t}_i\}$. In the ideal case (no channel interference, no signal distortion on the received RF signal path), the received sequence of zero crossings $\{\hat{t}_i\}$ would correspond to the sequence $\{t_i\}$ to be expected, shown in FIG. 1.

The sequence of zero crossings $\{\hat{t}_i\}$ measured is supplied to a symbol or symbol-sequence detector 11. Furthermore, a unit 12 for generating zero-crossing reference sequences provides a multiplicity of zero-crossing reference sequences $\{t_i\}$ for the symbol or symbol-sequence detector 11 which will be called demodulator in the text which follows.

The elements $t_i$ of the zero-crossing reference sequences $\{t_i\}$ received in the interference-free case can be described as a map of state variables and thus as output of an FSM. If the modulation method used has a memory of length L (i.e., apart from the current data symbol (bit) $d_k$), the last L data symbols $d_{k-1}, d_{k-2}, \ldots, d_{k-L}$ influence the functional variation of the modulated signal in the current symbol interval $[kT_b, (k+1)T_b]$), the zero crossings $t_i$ in the interval $[kT_b, (k+1)T_b]$ can be represented as a function f of the state variables $d_k, d_{k-1}, d_{k-2}, \ldots, d_{k-L}$ and of a phase $\phi_k$, where $\phi_k$ contains a description of the entire past up to the time $(k-L)T_b$ and is also a state variable. Therefore, $$t_i = f(d_k, d_{k-1}, \ldots, d_{k-L}, \phi_k) \text{ where } t_i \in [kT_b, (k+1)T_b]. \quad (1)$$

Figure 3:
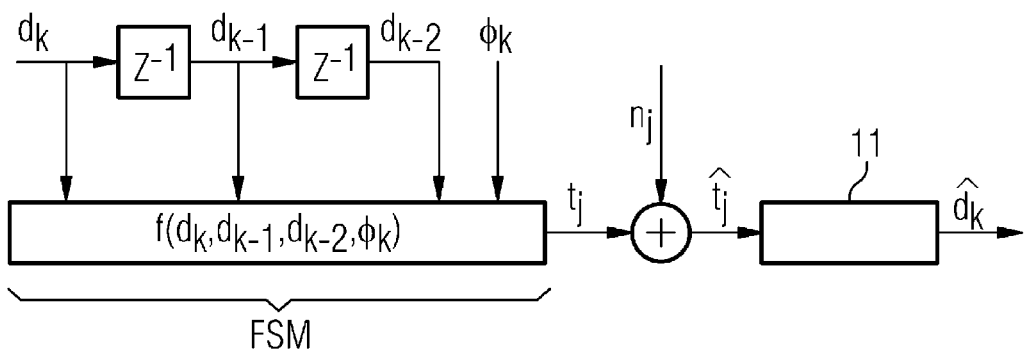
FIG. 3 is a block diagram illustrating a model of the signal generation of the interference-free sequence of zero crossings $\{t_i\}$ with an assumed modulation memory length of L=2, and a representation of the influence of channel disturbances on this sequence of zero crossings.

In FIG. 3, the FSM for the signal generation of the zero-crossing sequence $\{t_i\}$ is shown for an assumed modulation memory length of L=2. $Z^{-1}$ designates a delay by one symbol interval in the z space.

The unit 12 of FIG. 2 implements the FSM shown in FIG. 3; i.e. in the unit 12, the respective zero-crossing reference sequences $\{t_i\}$ are calculated for the possible states of the FSM (i.e. data symbols $d_k, d_{k-1}, d_{k-2}, \ldots, d_{k-L}$ and phase $\phi_k$) for the current time increment k.

Actually, in one embodiment, the function for calculating the output values $t_i$, forming the basis of the FSM, is predetermined by the signal generation method (modulation method) used. If the function f is linear, it can be used according to the invention for calculating the zero crossings $t_i$. If not, the relationship between the state variables and the zero crossings $t_i$, predetermined by the signal generation method, is linearized in accordance with the invention so that an explicit and simple mapping rule f for calculating the zero crossings $t_i$ in the interval $[kT_b, (k+1)T_b]$ can be specified and is implemented in the unit 12.

The description of the zero-crossing sequence $\{t_i\}$ as output of an FSM and the linearization of the relationship between the state variables $(d_k, d_{k-1}, d_{k-2}, \ldots, d_{k-L}, \phi_k)$ and the zero crossings $t_i$ allows the modeling of the dependence between $t_i$ and $d_k$, according to one embodiment of the invention, as shown in FIG. 3. This signal generation model can thus be used for describing the transmission system shown in FIG. 2. The digital noise contribution $n_t$ represents the disturbance of the zero-crossing times caused by the analog noise contribution n(t).

In the text which follows, the transmission model shown in FIG. 2 is explained in greater detail with the example of a GFSK modulation. In this explanation, the idealized interference-free case is used as a basis (since it is intended to calculate the zero-crossing reference sequences by means of this example).

The following applies for the interference-free intermediate-frequency signal y(t) supplied to the limiter discriminator 1:

$$y(t) = A\cos(\omega_{IF}t + \phi(t)). \quad (2)$$

The phase $$\phi(t) = \int_{-\infty}^{t} \omega(\tau)d\tau \quad (3)$$

is obtained as integral over the instantaneous frequency $$\omega(t) = \Delta\omega \sum_{k=-\infty}^{\infty} d_k g(t - kT_b). \quad (4)$$

For the data symbols, $d_k \in \{-1, 1\}$ applies, $T_b$ designates the bit period (equal to the symbol period in this case) and $\Delta\omega$ designates the frequency deviation. In GFSK, the impulse function g(t) is defined by $$g(t) = \frac{1}{2}\left\{erf\left(\alpha\frac{t}{T_b}\right) - erf\left(\alpha\frac{t-T_b}{T_b}\right)\right\} \quad (5)$$

where $\alpha = 2/\sqrt{2\ln 2}$. The function erf(•) stands for the Gaussian error function. The resultant phase is, from equation (3), $$\phi(t) = \pi\eta \sum_{k=-\infty}^{\infty} d_k q(t - kT_b) \quad (6)$$

with the index of modulation $$\eta = \frac{\Delta\omega T_b}{\pi}. \quad (7)$$

The phase function q(t) is then:

$$q(t) = \frac{1}{T_b}\int_{-\infty}^{t} g(\tau)d\tau. \quad (8)$$

The phase function q(t) can be specified in very good approximation in the form $$q(t) = \begin{cases} 0, & t \leq 0 \\ q(t) & 0 < t < (L+1)T_b, \\ 1, & t \geq (L+1)T_b \end{cases} \quad (9)$$

where L is the length of the modulation memory.

Figure 4:
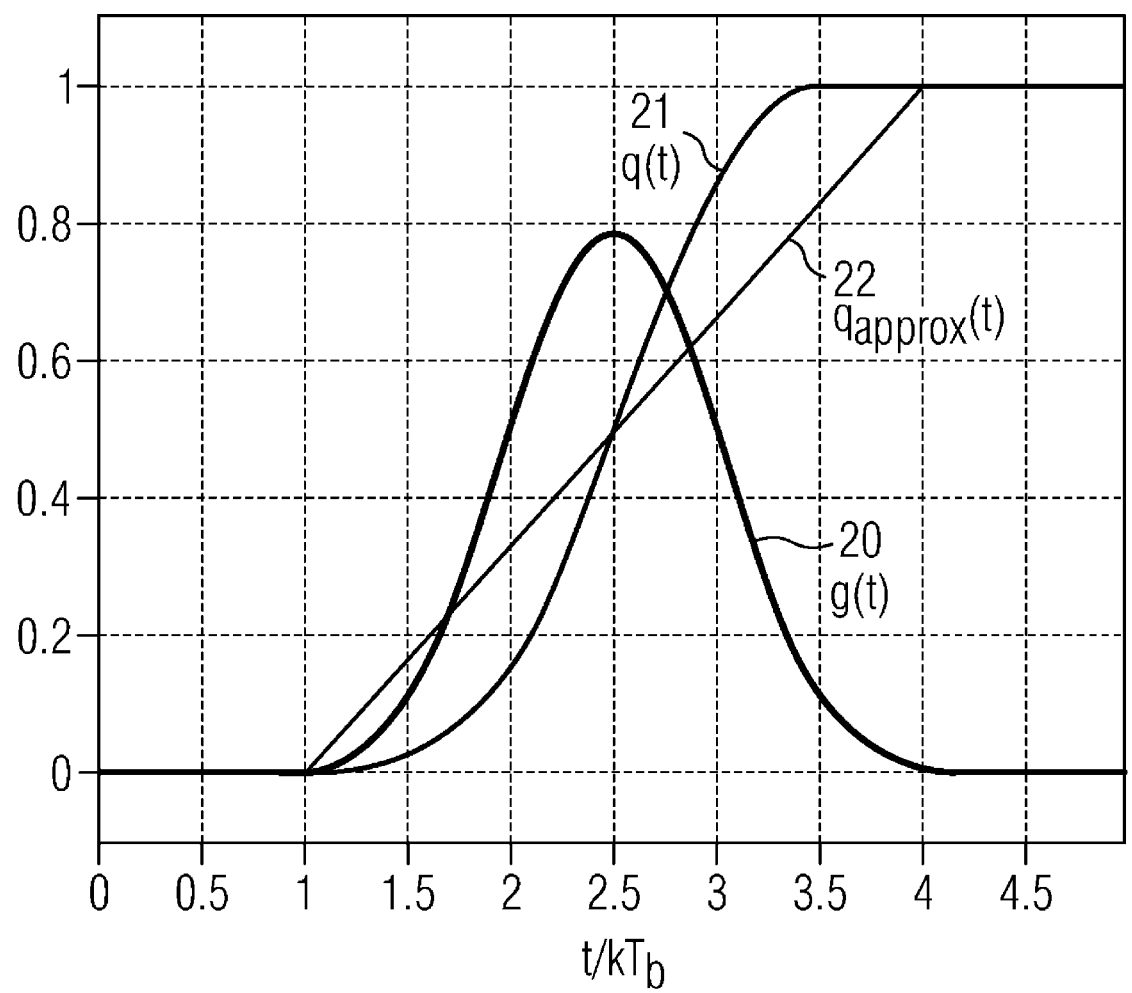
FIG. 4 is a graph illustrating the spectral impulse function g(t), the phase function q(t) and its linear approximation $q_{approx}(t)$ over time in units of the symbol intervals.

FIG. 4 shows the spectral impulse function g(t) in the curve 20, and the phase function q(t) in the curve 21. It becomes clear that, with L=4, making the edge areas of the phase function q(t) constant according to equation (9) only causes a very slight approximation error.

Taking equation (9) into consideration, the phase variation in the interval $[kT_b, (k+1)T_b]$ can be written as follows:

$$\phi(t) = \pi\eta \sum_{l=-\infty}^{K} d_l q(t - lT_b), \quad t \in [kT_b, (k+1)T_b] \quad (10)$$

$$= \underbrace{\pi\eta \sum_{l=-\infty}^{k-L-1} d_l q(t - lT_b)}_{\phi_k} + \pi\eta \sum_{l=k-L}^{k} d_l q(t - lT_b)$$

$$= \phi_k + \pi\eta \sum_{l=k-L}^{k} d_l q(t - lT_b).$$

Accordingly, the phase variation in the interval $[kT_b, (k+1)T_b]$ depends on the phase angle $\phi_k$ at time $t=(k-L-1)T_b$ and the data $d_{k-L}, d_{k-L+1}, \ldots, d_k$.

The condition for the zero crossings $\{t_i\}$ is $y(t_i)=0$. For a zero crossing at $t_i$ in the interval $[kT_b, (k+1)T_b]$, the following holds true, therefore:

$$m\pi = \omega_{IF} t_i + \phi(t_i) \quad (11)$$

$$= \omega_{IF} t_i + \phi_k + \pi\eta \sum_{l=k-L}^{k} d_l q(t_i - lT_b)$$

where $m = 1, \ldots, M$ m must be incremented from 1 to M for as long as the corresponding zero crossings $t_i$ are still within the interval $[kT_b, (k+1)T_b]$.

Equation (11) defines the zero crossings $t_i$ for GFSK-modulated signals via a non-linear relation. This leads to equation (11) being a transcendent equation which generally can be solved only with difficulty—for example by iterative methods. Calculating the zero-crossing reference sequences on the basis of this equation is virtually impossible in a receiver which can be used commercially.

According to the invention, the phase function q(t) is approximated by a piecewise linear function.

$$q_{approx}(t) = \begin{cases} 0, & x \leq 1 \\ \frac{1}{3}x - \frac{1}{3}, & 1 < x \leq 4 \\ 1, & x > 4 \end{cases} \quad (12)$$

The function $q_{approx}(t)$ is shown by the curve 22 in FIG. 4.

If the piecewise linear function $q_{approx}(t)$ according to equation (12), which applies to GFSK-modulated signals, is inserted in equation (11) for q(t), the following is obtained:

$$m\pi = \omega_{IF} t_i + \phi(t_i) \quad (13)$$

$$= \omega_{IF} t_i + \phi_k + \pi\eta \sum_{l=k-L}^{k} d_l q(t_i - lT_b)$$

$$= \omega_{IF} t_i + \phi_k + \frac{1}{3}\pi\eta \begin{pmatrix} d_{k-1}(t_i - (k-1)T_b) + \\ d_{k-2}(t_i - (k-2)T_b) + \\ d_{k-3}(t_i - (k-3)T_b) - 1 \end{pmatrix}$$

Transforming this relation, then $$t_i = \frac{\frac{1}{3}\pi\eta \begin{pmatrix} 1 + T_b(d_{k-1}(k-1) + \\ d_{k-2}(k-2) + d_{k-3}(k-3)) \end{pmatrix} + m\pi - \phi_k}{\omega_{IF} + \frac{1}{3}\pi\eta(d_{k-1} + d_{k-2} + d_{k-3})} \quad (14)$$

is the solution for equation (11) using $q_{approx}(t)$. Thus, the zero points $t_i$ can be approximately calculated and the zero-crossing reference sequences $\{t_i\}$ can be specified via a simple calculation (see equation (14)) which can be performed on-line.

It is pointed out that the demodulator 11 can be implemented in different ways and all such variations are contemplated as falling within the scope of the present invention. A simple implementation is specified in the document DE 102 14 581.4 and shown in FIG. 5. The detector 1 for zero crossings is followed by a counter 10' which outputs a sequence of time intervals between successive zero crossing times t_delta$_i$. The counter 10' counts clock pulses that are supplied thereto at a constant frequency $f_0$, and is reset with each zero crossing. Before the counter 10' is reset, the count t_delta$_i$ reached is output and stored in a shift register chain 13 following the counter 10'.

Figure 5:
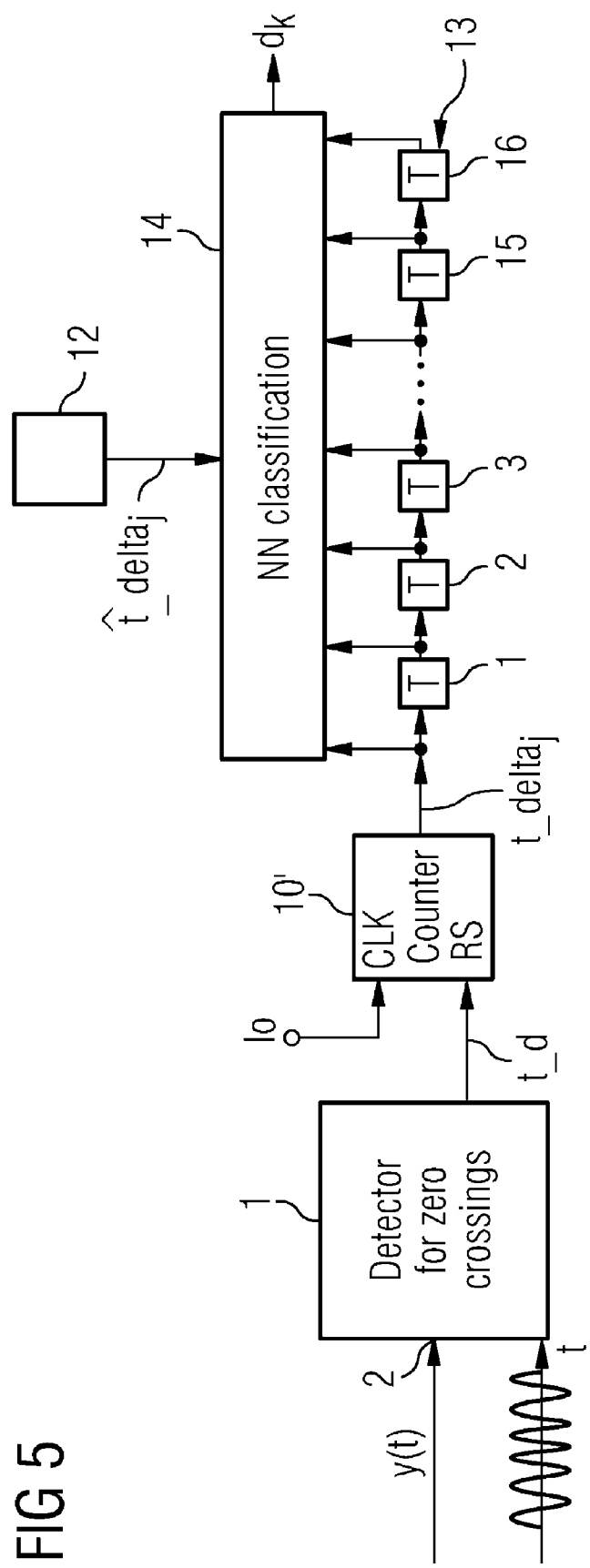
FIG. 5 is a block diagram illustrating a demodulator circuit following the detector for zero crossings according to an embodiment of the invention.

Since the influence of a bit (symbol) is distributed over a number of bit intervals (symbol intervals) when band-limited frequency modulation such as GMSK is used, it is appropriate to use all zero crossings in this greater time interval, for detecting the associated bit. In GMSK, one bit influences the transmitting frequency over a time interval of 5 bit periods. At an intermediate frequency of 1 MHz, the number of zero crossings in this time interval is approximately 16. It is, therefore, appropriate to use 16 values for detecting one bit as is shown in FIG. 5. These 16 zero crossings are thus determined not only by the bit to be detected but also by the two preceding and two subsequent bits. It is, therefore, appropriate to determine not only 1 bit but a bit sequence from the successive zero crossings. In this example, 5 successive bits can be determined from the 16 zero crossings.

The detection is carried out with the aid of a classification device 14 which determines the distance of the zero-crossing sequence determined in each case and stored in the shift register chain 3 with the zero-crossing reference sequences calculated by the unit 12 for calculating zero-crossing sequences. The zero-crossing reference sequences are obtained in the manner described from the zero crossings for all possible bit sequences. If 5 successive bits are considered, $2^5=32$ possible bit combinations are obtained as state variables for the FSM and thus corresponding zero-crossing reference sequences which must be compared with the zero-crossing sequence stored in the shift register chain 13. The sequence of state variables which is correlated with the zero-crossing reference sequences having the shortest distance from the detected zero-crossing sequence t_delta$_i$ is detected as the transmitted signal sequence $d_k$. If this comparison is in each case performed in the space of one bit period, a total of 5 results are available for each bit. The classification device 14 can then determine the detected bit in the time increment k, e.g. on the basis of a majority decision.

A method used in one embodiment of the invention for calculating the distance between the zero-crossing distances t_delta$_i$, stored in the shift register chain 13, and the zero-crossing distances $\hat{t}$_delta$_i$ of the reference sequences consists in calculating the Euclidian distance norm according to the following relation $$d(\{t\_delta_i\}, \{\hat{t}\_delta_i\}) = \sqrt[g]{\sum_{i=1}^{M} |t\_delta_i - \hat{t}\_delta_i|^g} \quad (15)$$

where g=2 and M=16. A simplification of the calculation of the distance between the zero-crossing sequence measured and the zero-crossing reference sequences is obtained from the above relation for g=1 and is called "city block metric".

Furthermore, in another embodiment, the demodulator 11 of FIG. 1 and FIG. 5 can perform a demodulation according to the Viterbi algorithm. The state variables of the FSM in this case define the states of a trellis diagram. As is known in the technology, e.g. in the field of channel decoding or channel equalization, Viterbi processing determines the shortest path through the trellis diagram. For this purpose, a transition metric (also called branch metric) is calculated for every possible transition from a precursor state (time increment k) into a target state (time increment k+1) of the trellis diagram. The transition metric is added to the state metric of the associated precursor state (ADD). Thus, state metrics are accumulated transition metric values. The possible state metric values of a target state, obtained at the various transitions into this particular target state, are compared (COMPARE operation), and the path having the smallest state metric value for the target state considered is selected (SELECT operation). The remaining paths are discarded. As is generally known, the ADD-COMPARE-SELECT (ACS) operations provide for an efficient and inexpensive determination of the transmitted symbol sequence. To calculate the transition metric values, the Euclidian metric is normally used in the Viterbi algorithm.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for calculating zero-crossing reference sequences for the data detection of a sequence of zero crossings of a received signal that is based on a data symbol sequence angle-modulated signal, comprising calculating the zero-crossing reference sequences according to an equation specifying an output of a finite state machine that describes signal generation in a device, performing a demodulation by determining a transmitted data sequence by comparing the calculated zero-crossing reference sequences with a detected sequence of zero crossings, wherein the comparing comprises comparing a part-sequence of finite length of the detected sequence of zero crossings with the zero-crossing reference sequences for each time increment, wherein a data symbol transmitted in the time increment considered is determined by way of the comparison, and wherein determining the data symbol sequence is performed in accordance with the Viterbi algorithm by processing a trellis diagram that describes a state diagram of the finite state machine, for each time increment, wherein transition metric values between a precursor state and a target state in the trellis diagram are calculated by comparing the state-dependent zero-crossing reference sequences with the sequence of zero crossings detected for the time increment considered.

2. The method of claim 1, further comprising using a modulation memory of length L, with L≧2, to perform the angle-modulation at the transmitter.

3. The method of claim 1, wherein the angle-modulated signal is generated in accordance with a GFSK modulation method.

4. The method of claim 1, wherein the angle-modulated signal is generated in accordance with a binary FSK or MSK modulation method.

5. The method of claim 1, wherein the finite state machine describes the signal generation in an approximate fashion.

6. A method of demodulating a received angle-modulated signal, comprising: detecting a sequence of zero-crossings based on the received angle-modulated signal; generating a plurality of zero-crossing reference sequences in accordance with a predetermined algorithm that is a function of a device performing the angle-modulation of the received signal; determining one or more data symbols associated with the received signal by comparing the detected sequence of zero-crossings with the plurality of zero-crossing reference sequences; and determining the one or more data symbols comprises: correlating the detected sequence of zero-crossings with the plurality of zero-crossing reference sequences; selecting one of the zero-crossing reference sequences having a correlation associated with a predetermined criteria; and determining the one or more data symbols based on the selected zero-crossing reference sequence.

7. The method of claim 6, wherein detecting the sequence of zero-crossings comprises: counting a number of periodic pulses between successive zero-crossings for a plurality of zero-crossings; and generating a sequence of time intervals associated with the plurality of zero-crossings.

8. The method of claim 6, wherein generating the plurality of zero-crossing reference sequences comprises: ascertaining a spectral impulse function associated with the device; ascertaining a phase function associated with the device; and calculating the zero-crossing reference sequences using the spectral impulse function and the phase function associated with the device.

9. The method of claim 8, further comprising ascertaining the phase function by approximating the phase function by a piecewise linear function.

10. The method of claim 6, wherein correlating comprises calculating a Euclidean distance between the detected sequence of zero-crossings and each of the zero-crossing reference sequences.

11. The method of claim 10, wherein selecting one of the zero-crossing reference sequences comprises selecting the reference sequence having the smallest Euclidean distance from the detected sequence of zero-crossings.

* * * * *

UNITED STATES PATENT AND TRADEMARK OFFICE
CERTIFICATE OF CORRECTION

PATENT NO. : 7,940,853 B2
APPLICATION NO. : 12/358255
DATED : May 10, 2011
INVENTOR(S) : Andre Neubauer Page 1 of 1

It is certified that error appears in the above-identified patent and that said Letters Patent is hereby corrected as shown below:

On the face of the patent, Number (54), please change the Title "Method and device for calculating zero-croccing reference sequences for signal detection of angle-modulated signals based on zero crossings of the received signal" to --METHOD AND DEVICE FOR CALCULATING ZERO-CROSSING REFERENCE SEQUENCES FOR SIGNAL DETECTION OF ANGLE-MODULATED SIGNALS BASED ON ZERO CROSSINGS OF THE RECEIVED SIGNAL--

Signed and Sealed this
Fifteenth Day of May, 2012

David J. Kappos
*Director of the United States Patent and Trademark Office*